(12) United States Patent
Izumi (10) Patent No.: US 6,181,405 B1
(45) Date of Patent: Jan. 30, 2001

(54) LARGE SCREEN DISPLAY DEVICE WITH A PLURALITY OF INDEPENDENTLY SEALED AND INTERCONNECTED SUBSTRATES

(75) Inventor: Yoshihiro Izumi, Kashihara (JP)

(73) Assignee: Sharp Kabushiki Kaisha, Osaka (JP)

( * ) Notice: Under 35 U.S.C. 154(b), the term of this patent shall be extended for 0 days.

(21) Appl. No.: 09/010,249

(22) Filed: Jan. 21, 1998

(30) Foreign Application Priority Data

Jan. 30, 1997 (JP) .................................................... 9-017038

(51) Int. Cl.[7] ........................ G02F 1/1333; G02F 1/1335; G02F 1/1339
(52) U.S. Cl. .............................. 349/153; 349/73; 349/158
(58) Field of Search .................................... 349/153, 154, 349/158

(56) References Cited

U.S. PATENT DOCUMENTS 4,579,424 * 4/1986 Matsukawa et al. ................. 349/143
4,776,673 * 10/1988 Aoki et al. ............................ 349/143
5,812,226 * 9/1998 Izumi et al. ............................ 349/73

FOREIGN PATENT DOCUMENTS 4-28086   7/1992 (JP) .
8-184849  7/1996 (JP) .

* cited by examiner

*Primary Examiner*—William L. Sikes
*Assistant Examiner*—Toan Ton
(74) *Attorney, Agent, or Firm*—Dike, Bronstein, Roberts & Cushman, LLP; David G. Conlin; George W. Hartnell, III (57) ABSTRACT

The liquid crystal display device of the present invention has an arrangement wherein a plurality of TFT substrates being connected to each other on the sides are combined with a counter substrate via seal materials, and liquid crystal is enclosed therebetween. The seal materials are formed along peripheries of each TFT substrate without crossing to the other TFT substrate. This arrangement allows a liquid crystal layer to be provided independently for each TFT substrate. Also, between seal materials formed along respective adjacent sides of the adjoining TFT substrates connected to each other, a bonding agent is injected. The bonding agent connects to each other the TFT substrates on the sides, and also contacts with the counter substrate.

12 Claims, 11 Drawing Sheets

LARGE SCREEN DISPLAY DEVICE WITH A PLURALITY OF INDEPENDENTLY SEALED AND INTERCONNECTED SUBSTRATES

FIELD OF THE INVENTION

The present invention relates to a display device such as a liquid crystal display device, and more particularly to a display device allowing a large screen to be adopted by using a flat connected substrate composed of a plurality of small substrates connected to each other on the sides.

BACKGROUND OF THE INVENTION

Recently, a demand for a larger screen has been on the rise in a display device adopted in audio-visual (AV) equipment and office automation (OA) equipment, etc. In order to meet such a demand, the cathode ray tube (CRT) system, a liquid crystal display device (LCD), a plasma display device (PDP), an electroluminescence (EL) display device, and a light-emitting diode (LED) display device are under extensive research to realize an actual application of those devices.

Of those devices, the liquid crystal display device in particular has such an advantage in that (1) the thickness (depth) can be made significantly thinner compared with other display devices, (2) power consumption is low, and (3) a full-color image can be obtained with ease. For these reasons, the liquid crystal display device has been applied in a wide variety of fields, and is considered to be the best candidate for realizing a larger screen.

However, in the liquid crystal display device, when the screen is to be made larger, in the manufacturing process, the fraction defective induced by breakage of signal lines and a pixel failure is conspicuously increased. This presents a problem of a rise in cost.

The following will explain such a problem in detail using as an example an active-matrix-type liquid crystal display device which is most widely adopted. The active-matrix-type liquid crystal display device has an arrangement wherein liquid crystal is enclosed between a pair of substrates. One of the pair of substrates constitutes an active-matrix substrate on which a small active element such as a TFT (Thin Film Transistor) or an MIM (Metal-Insulator-Metal) is formed for each pixel. Thus, when the active matrix substrate is made larger, the active element and surrounding circuits become susceptible to breakage and failure. As a result, the fraction non-defective is conspicuously reduced.

As a method for solving this problem, a method for realizing a larger screen liquid crystal display device has been suggested in which a substrate is prepared by connecting to each other a plurality of small substrates on the sides, and the substrate thus prepared is faced with a large substrate sandwitching a liquid crystal layer therebetween.

Figure 7:
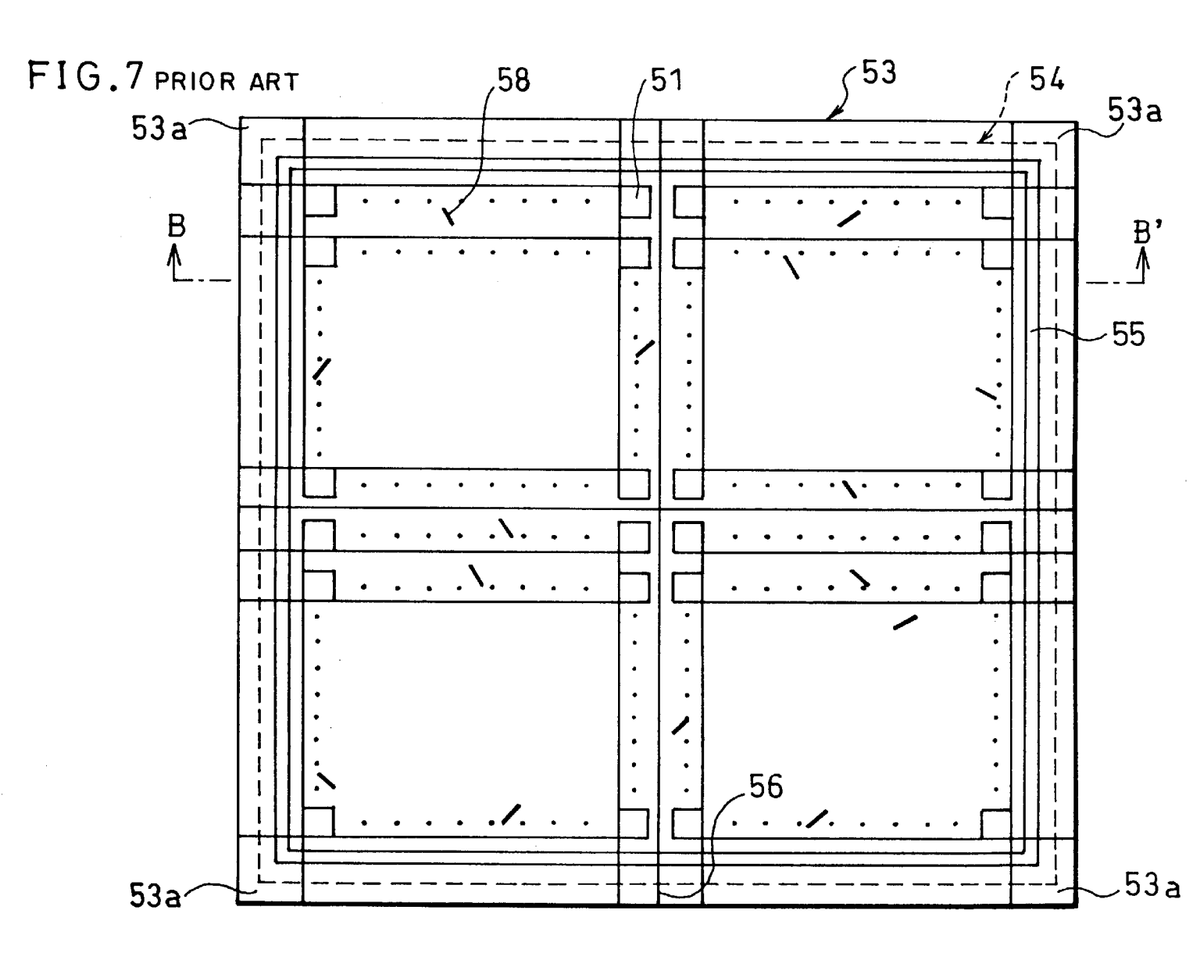
FIG. 7 is a plan view of a conventional liquid crystal display device.

For example, Japanese Publication for Unexamined Utility Model No. 191029/1985 (Jitsukaishou 60-191029) discloses a method for realizing a large screen liquid crystal display device in which, as shown in FIG. 7, (1) a large substrate 53 composed of small active matrix substrates (referred to as small substrates hereinafter) 53a provided in a 2×2 arrangement on which pixel electrodes 51 are formed in matrix, and (2) a large substrate (referred to as counter substrate hereinafter) 54, on which counter electrodes (not shown) are formed, having a size substantially the same as the large substrate 53 are faced each other so as to be combined with a seal material 55.

Figure 8:
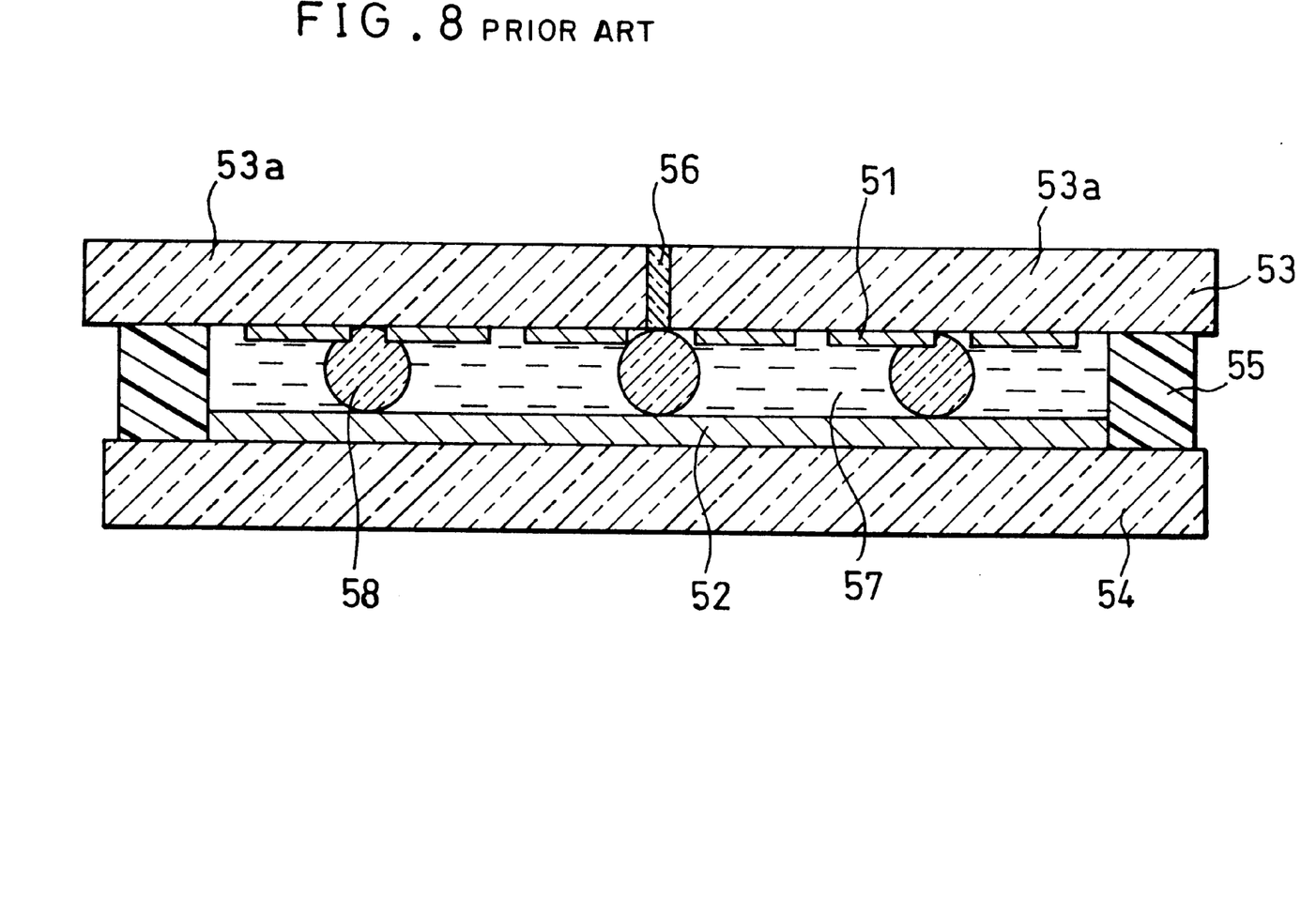
FIG. 8 is a cross sectional view of the conventional liquid crystal display device of FIG. 7 taken along a line B–B'.

In this arrangement, as shown in FIG. 8, the small substrates 53a are connected to each other on the sides by a transparent bonding agent 56 so that the small substrates 53a thus connected to each other constitute the large substrate 53, and between the large substrate 53 and the counter substrate 54, a liquid crystal layer 57 is formed as liquid crystal is enclosed by the seal material 55 therebetween. Also, spacers 58, which determine the thickness (cell gap) of the liquid crystal layer 57, are spread over the region surrounded by the seal material 55.

In the liquid crystal display device having the described arrangement, lowering of the fraction non-defective in response to a larger screen can be prevented, and therefore the productivity in the manufacturing process can be increased.

However, according to the method disclosed in Japanese Publication for Unexamined Utility Model No. 191029/1985 (Jitsukaihei 60-191029), as described above, in order to combine the counter substrate 54 and the large substrate 53 with each other, it is required beforehand to connect the small substrates 53a to each other on the sides so as to obtain the large substrate 53. Generally, as the small substrates 53a, a glass substrate having a thickness of 0.7 mm or 1.1 mm is adopted. Thus, even when the small substrates 53a are connected to each other on the sides by the bonding agent 56, because the bonding area is so small that the strength of the connecting portion connecting the small substrates 53a is extremely weak.

For example, in the case where two or four small substrates 53a each having an area of 300 mm×400 mm are connected, the small substrates 53a are connected to each other on the sides having a thickness of mere 0.7 mm or 1.1 mm. Thus, the strength of the connecting portion is extremely weak so that the connecting portion is destroyed by only a small amount of an external force. This presents a problem that the liquid crystal display device must be handled with great care not only in the manufacturing process but also as a product after the manufacturing process.

Further, on the large substrate 53 prepared by connecting to each other the small substrates 53a by the bonding agent 56, only a 2 μm to 3 μm step-difference at the connecting portion on the side contacting with the liquid crystal layer 57 changes the cell gap at the connecting portion. The change in cell gap caused in this manner adversely affects the display image.

For example, when the thickness of the liquid crystal layer 57 is 5 μm, a step-difference of only 2 μm to 3 μm at the connecting portion makes the thickness of the liquid crystal layer 57 substantially in half. For this reason, a change in cell gap is significant at the connecting portion compared with other regions. This presents a problem of nonuniformity in displayed colors, and the display image being adversely affected.

Figure 9A:
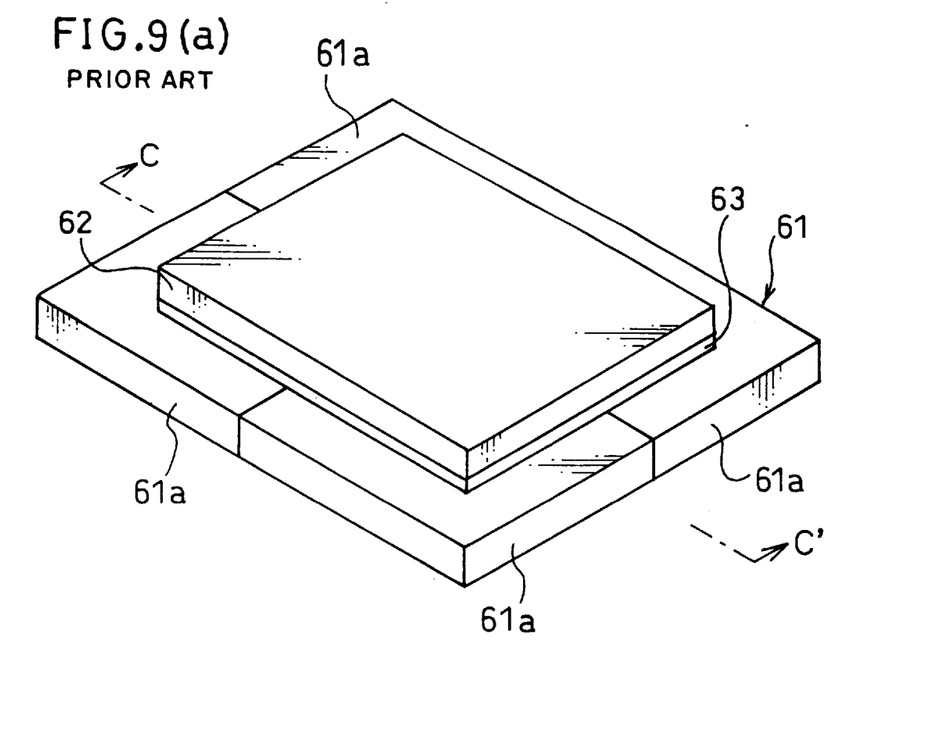
FIG. 9(a) is a perspective view of another conventional liquid crystal display device.
Figure 9B:
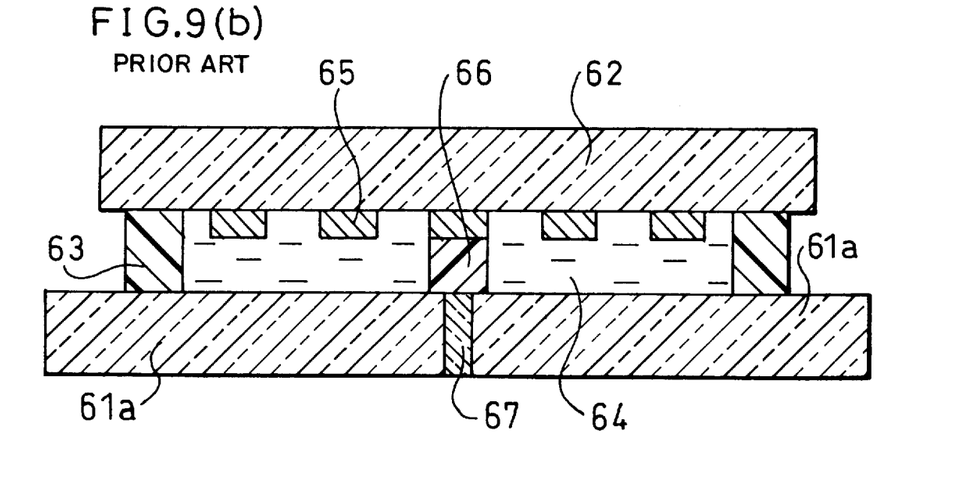
FIG. 9(b) is a cross sectional view of the conventional liquid crystal display device of FIG. 9(a) taken along a line C–C'.

In order to solve above-mentioned problems, Japanese Unexamined Patent publication No. 184849/1996 (Tokukaihei 8-184849) discloses a method for realizing a large screen liquid crystal display device wherein, as shown in FIG. 9(a) and FIG. 9(b), in a liquid crystal display device in which four small substrates 61a are connected to each other in a 2×2 arrangement so as to prepare a large substrate 61, and in which the large substrate 61 thus prepared and a counter substrate 62 are combined with each other so as to enclose therebetween a liquid crystal layer 64 by a seal material 63, a support base 66 is provided between the connecting portion of the small substrates 61a and a non-translucent patterning 65 formed on the counter substrate.

Figure 10A:
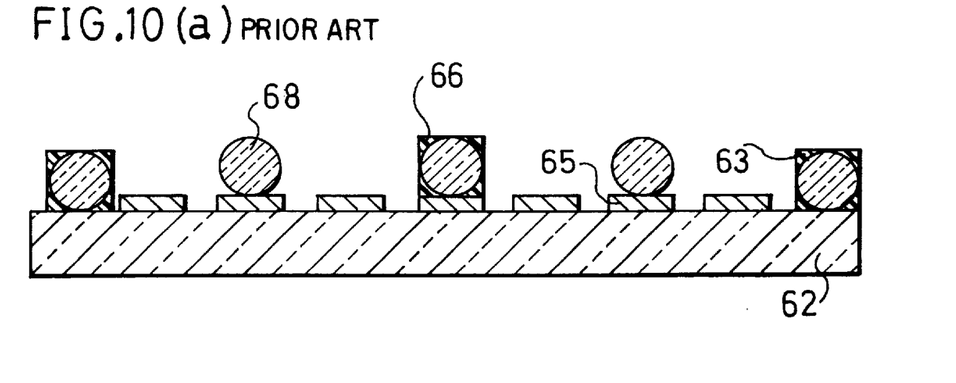

Specifically, in this method, as shown in FIG. 10(a), the seal material 63 and the non-translucent patterning 65 are provided on a counter substrate 62. Note that, the non-translucent patterning 65 is formed on a portion corresponding to the connecting portion of the small substrates 61a. On the non-translucent patterning 65, the support base 66 made of the same material as that of the seal material 63 is provided. Also, on a region surrounded by the seal material 63, gap materials 68 made of, for example, plastic beads are spread over. The gap materials 68 are also included in the seal material 63 and the support base 66.

Figure 10B:
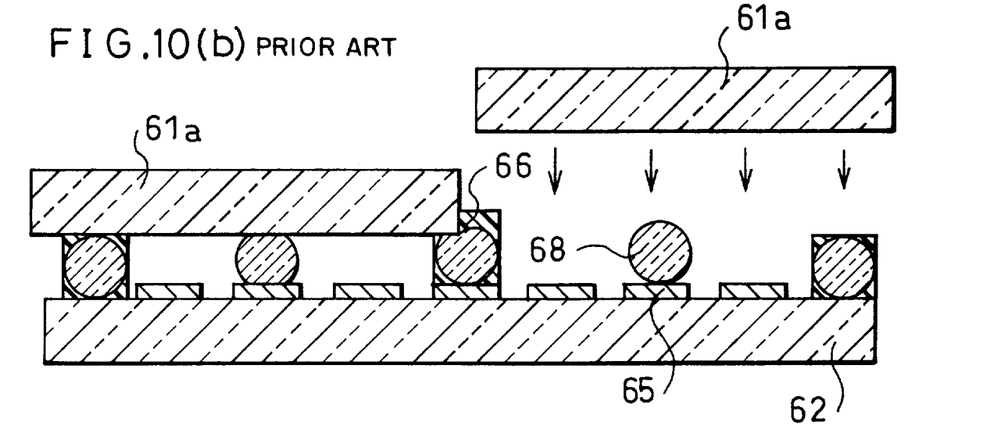
Figure 10C:
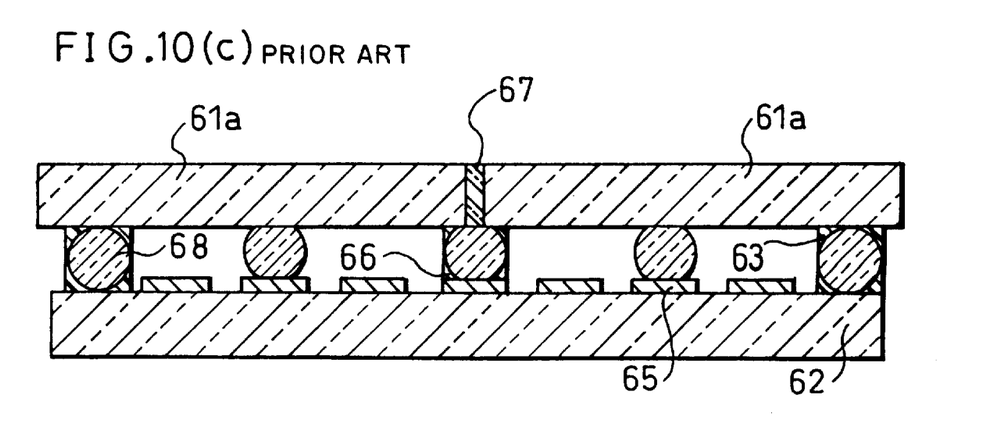

Then, as shown in FIG. 10(b), the small substrates 61a are combined one by one with the counter substrate 62, and as shown in FIG. 10(c), the bonding agent 67 is injected into the connecting portion of the small substrates 61a so as to connect the small substrates 61a to each other, thereby obtaining a liquid crystal display device.

Thus, in the liquid crystal display device manufactured in this manner, the support base 66 is provided between the connecting portion at which the small substrates 61a are connected to the bonding agent 67 and the non-translucent patterning 65 facing the connecting portion. With this arrangement, it is possible to prevent the fraction non-defective from lowering in response to making the screen of the liquid crystal display device large, and therefore the productivity can be increased, and bending generated with time on end portions of the small substrates 61a can be prevented. It is also possible to level the cell gap at the connecting portion of the small substrates 61a.

However, in the method disclosed in Japanese Unexamined Patent publication No. 184849/1996 (Tokukaihei 8-184849), the following problems may be presented in the manufacturing steps of a liquid crystal panel.

Figure 11:
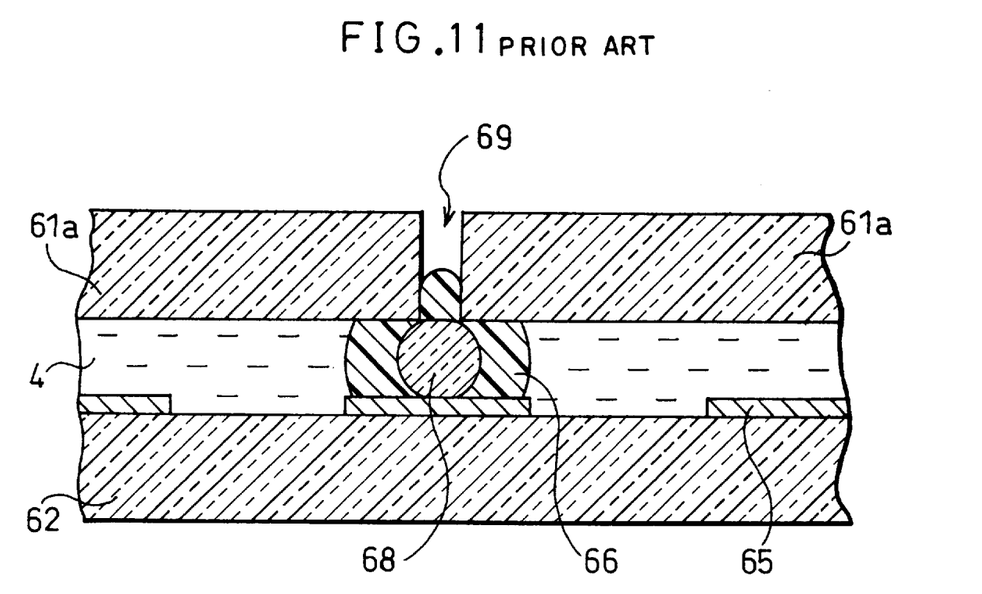
FIG. 11 is an enlarged cross sectional view showing one arrangement in a manufacturing method of the conventional liquid crystal display device.

In the method disclosed in the above publication, as shown in FIG. 11, when combining the small substrates 61a and the counter substrate 62, there is a chance that the support base 66 intrudes into a gap 69 at the connecting portion of the small substrates 61a. As the support base 66 and the seal material 63, colored resin such as white or light brown is widely adopted. For this reason, when such resin is present at the connecting portion between the small substrates 61a made of transparent glass, the light passing through the connecting portion is colored by being refracted or scattered. This adversely affects the display image.

SUMMARY OF THE INVENTION

It is an object of the present invention to provide a large screen display device having a high displaying quality using a connected substrate composed of two or more small substrates connected to each other on the sides.

In order to achieve the above-mentioned object, a display device of the present invention is characterized by including a flat connected substrate composed of a plurality of small substrates, each having at least electrodes, the plurality of small substrates being connected to each other on the sides, a counter substrate having at least electrodes, provided so as to face the flat connected substrate, seal materials for combining each of the plurality of small substrates with the counter substrate so as to enclose a medium therebetween, wherein the seal materials are provided along peripheries of each of the plurality of small substrates without crossing to the other of the plurality of small substrates so that the medium is separately enclosed per each of the plurality of small substrates.

With this arrangement, since the seal materials are provided along the peripheries of each of the plurality of small substrates without crossing to the other small substrates, at the connecting portion of the small substrates, the seal materials are prevented from entering a gap between the plurality of small substrates. As a result, it is possible to prevent a conventional problem of generation of refracting or scattering light at the connecting portion of the small substrates, induced by the intrusion of the seal materials. This prevents an adverse effect on the display image. Further, because the intrusion of the seal materials is prevented, it is not required to adopt transparent seal materials, allowing generally adopted colored resin to be adopted as the seal materials, thereby having an advantage in that the manufacturing cost can be reduced.

For a fuller understanding of the nature and advantages of the invention, reference should be made to the ensuing detailed description taken in conjunction with the accompanying drawings.

BRIEF DESCRIPTION OF THE DRAWINGS

FIG. 10 (a) through FIG. 10(c) are cross sectional views respectively showing an arrangement of the liquid crystal display device of FIG. 9(a) or FIG. 9(b) in an order of manufacturing steps.

DESCRIPTION OF THE EMBODIMENTS

The following will explain one embodiment of the present invention referring to attached drawings. Note that, the present invention is not limited to the following explanations.

Figure 1:
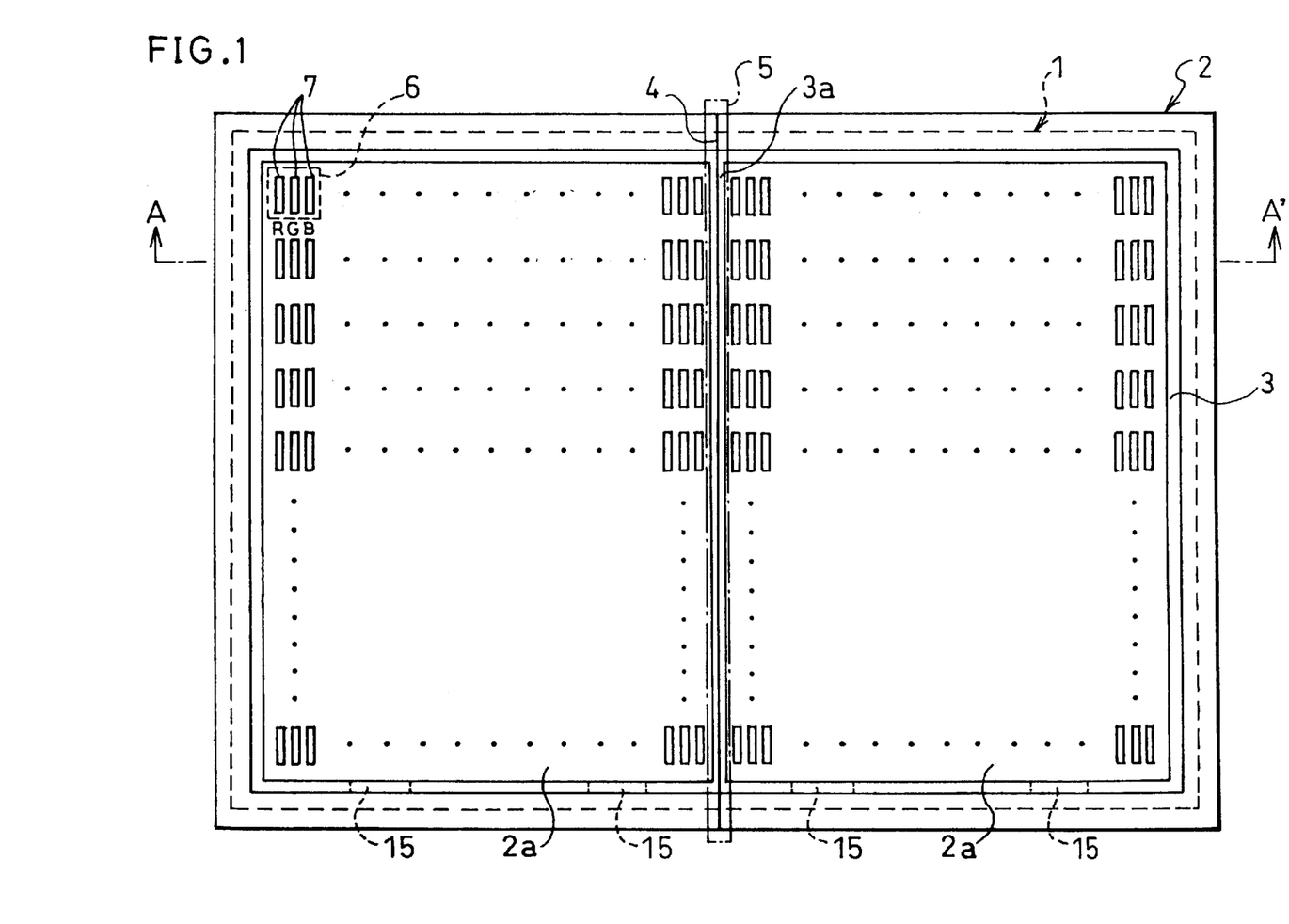
FIG. 1 is a plan view of a liquid crystal panel adopted in a liquid crystal display device in accordance with one embodiment of the present invention.

As shown in FIG. 1, a liquid crystal panel adopted in a liquid crystal display device of the present embodiment has an arrangement wherein (1) a large substrate (hereinafter referred to as counter substrate) 1 provided with counter electrodes (not shown) and (2) a connected substrate 2 prepared by connecting to each other, on the sides, two active matrix substrates (hereinafter referred to as TFT substrates) 2a (small substrates adopting TFT as an active element) are combined by seal materials 3 and 3a.

The seal materials 3 and 3a are provided along the peripheral end portions (four sides) of each TFT substrate 2a, and have a function of enclosing liquid crystal (medium) between each TFT substrate 2a and the counter substrate 1.

Figure 2:
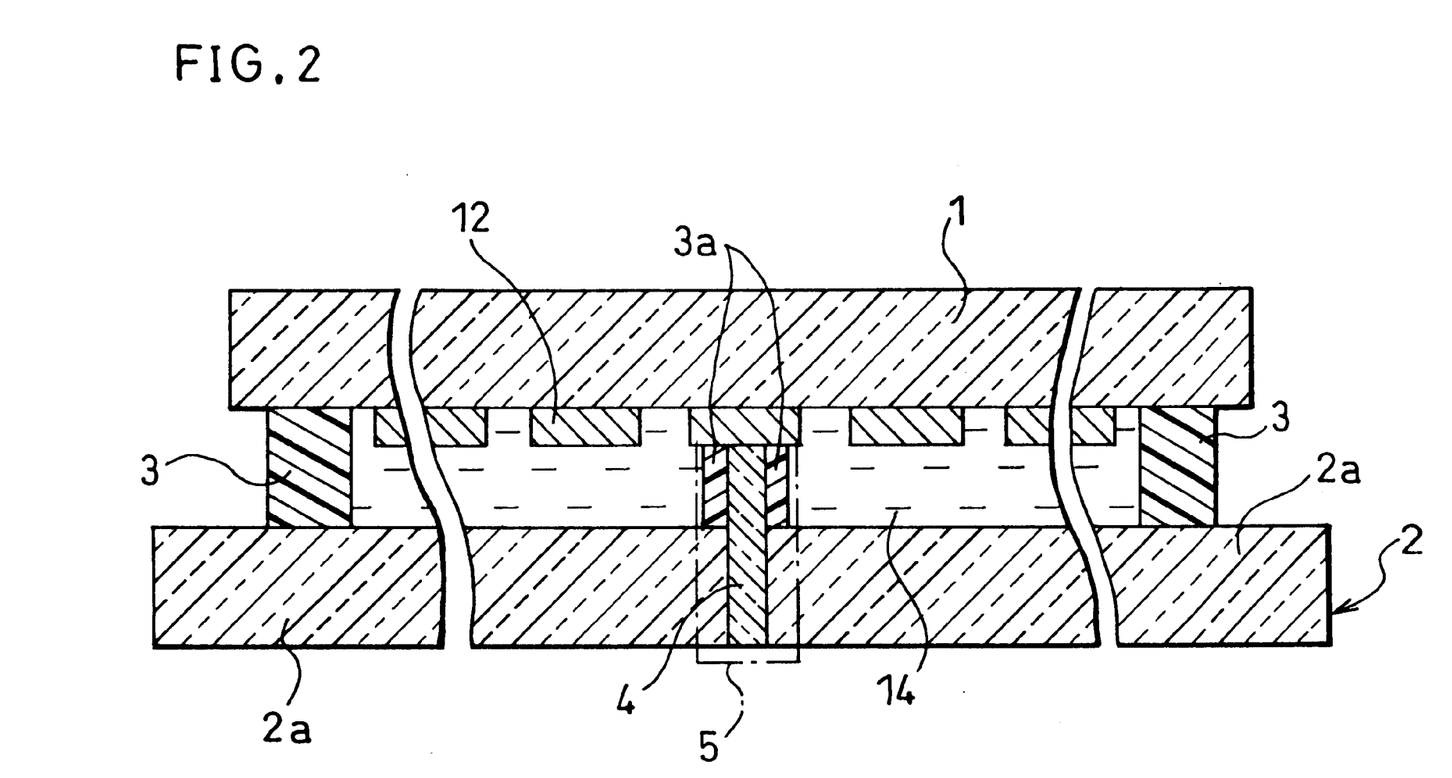
FIG. 2 is a cross sectional view of the liquid crystal panel of FIG. 1 taken along a line A–A'.

The TFT substrates 2a are connected to each other by a bonding agent 4, and at a connecting portion 5 of the TFT substrates 2a, as shown in FIG. 2, layers of the seal materials 3a are formed so as to be in contact with the both sides of a layer of the bonding material 4. Note that, the seal material 3a is made of the same material as that of the seal material 3; however, the width thereof is narrower than that of the seal material 3.

On each TFT substrate 2a, pixels 6 are formed in matrix, and on each pixel 6, as shown in FIG. 1, three pixel electrodes 7 corresponding to red (R), green (G), and blue (B) are provided.

Figure 3:
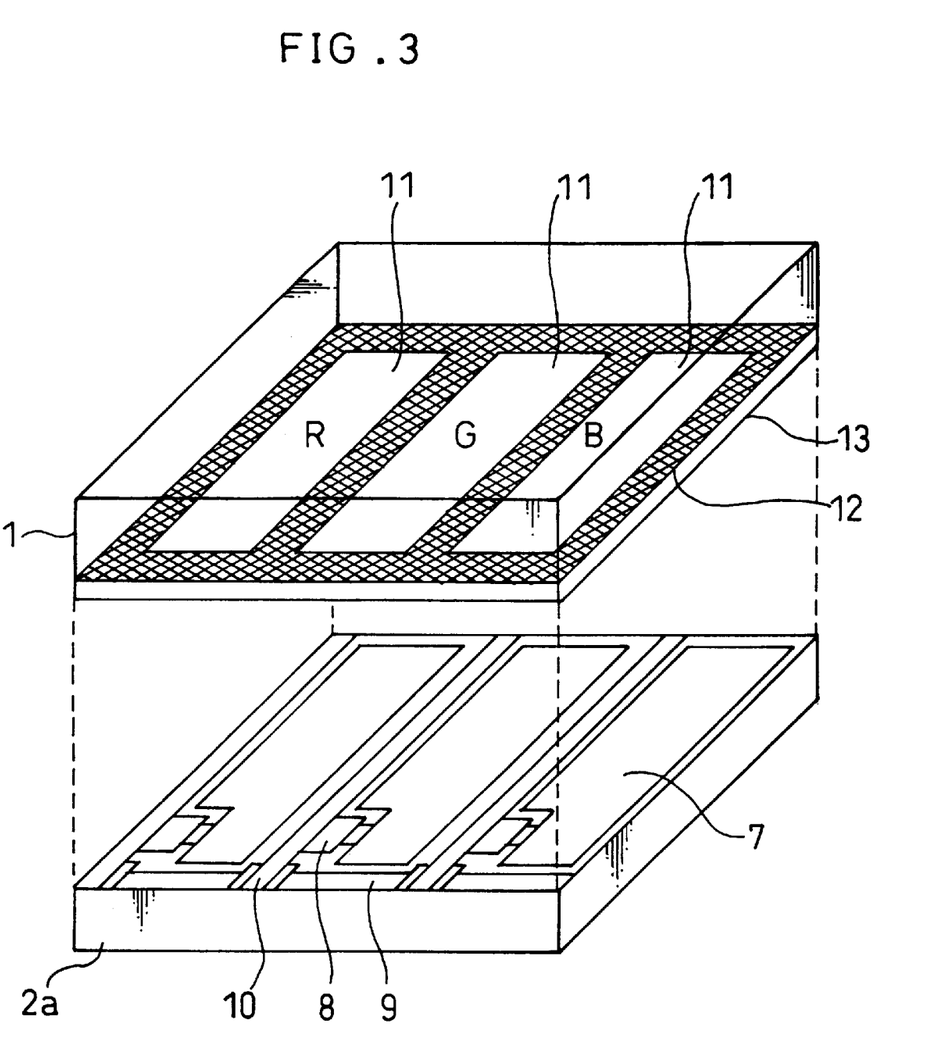
FIG. 3 is a perspective view separately showing a main arrangement of a pixel portion of the liquid crystal panel of FIG. 1.

To describe in more detail, as shown in FIG. 3, a TFT 8 as an active element is connected to each pixel electrode 7, and scanning lines 9 and signal lines 10 for driving the pixel electrodes 7 are formed so as to be orthogonal to each other. On the counter substrate 1, a color filter (hereinafter referred to as CF) 11 of red (R), green (G), and blue (B) corresponding to each pixel electrode 7, a black matrix (hereinafter referred to as BM) 12, and a common electrode 13 are provided.

As shown in FIG. 1 and FIG. 2, the seal materials 3 are provided on the side edge portions along the peripheries of each TFT substrate 2a, excluding the connecting portion 5 where the connection with the other TFT substrate 2a is made, so as to combine each substrate 2a and the counter substrate 1. On the other hand, the seal materials 3a are provided along the periphery of each TFT substrate 2a at the connecting portion 5 so as to combine each TFT substrate 2a and the counter substrate 1. In other words, the seal materials 3 and 3a are provided independently for each TFT substrate 2a without crossing to other TFT substrates 2a. This arrangement allows liquid crystal 14 to be separately sandwitched between each TFT substrate 2a and the counter substrate 1. Note that, on a portion of the counter substrate 1 facing the connecting portion 5 of the TFT substrates 2a, a row of BM 12 is formed, and as shown in FIG. 2, each TFT substrate 2a and the BM 12 are connected to each other by the seal materials 3a.

The layer of the bonding agent 4 at the connecting portion 5 is provided so as to connect the TFT substrates 2a to each other on the sides, and to contact with the counter substrate 1. More specifically, the layer of the bonding agent 4 is provided so as to be connected to the BM 12 facing the connecting portion 5. That is to say, the two TFT substrates 2a and the counter substrate 1 are combined with each other by the seal materials 3 and the seal materials 3a at the connecting portion 5 as well as by the bonding agent 4.

Figure 4:
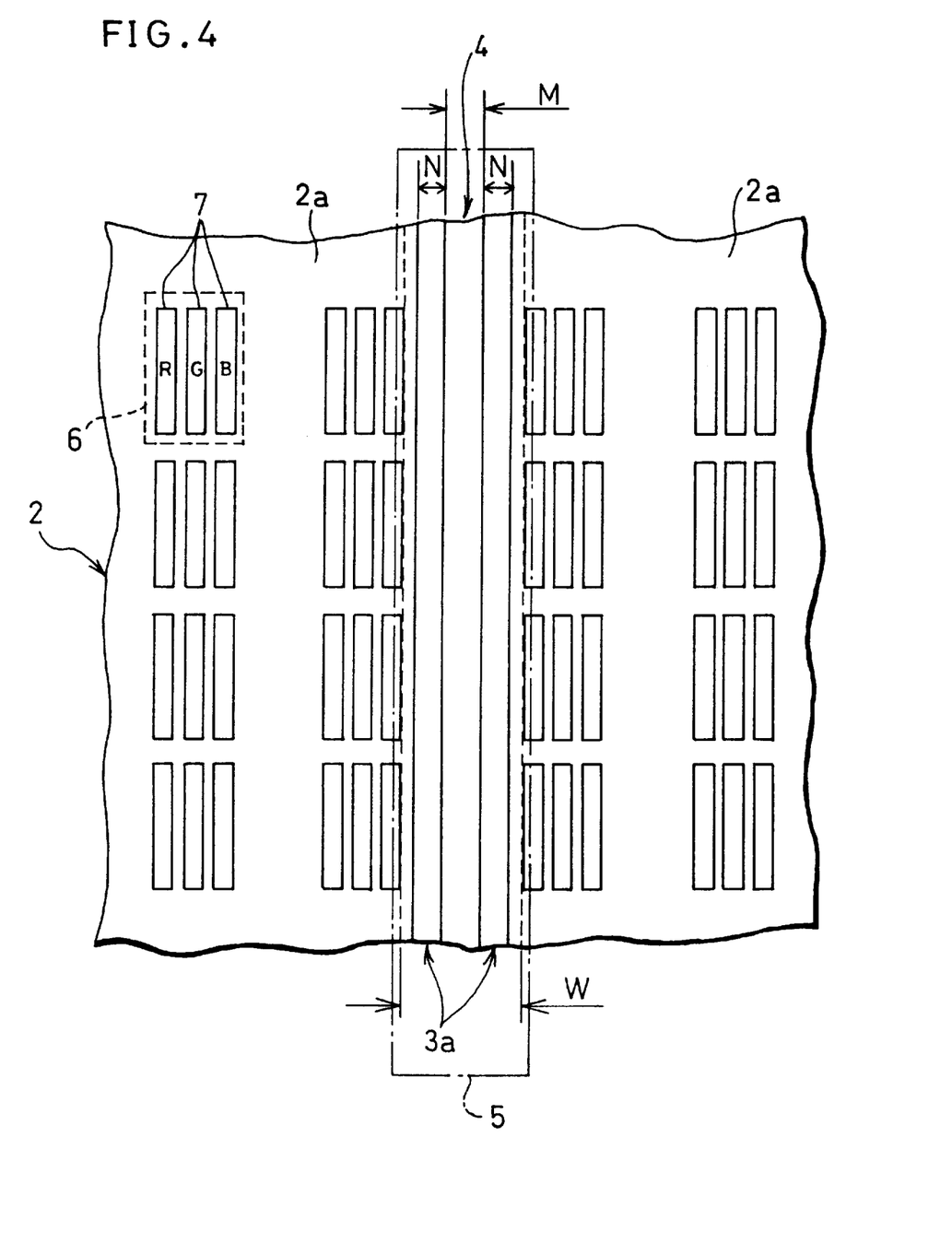
FIG. 4 is an enlarged plan view showing a vicinity of a connecting portion connecting two TFT substrates on the liquid crystal panel of FIG. 1.

Also, as shown in FIG. 4, the seal materials 3a and the layer of the bonding agent 4 are formed so as not to overlap the three pixel electrodes 7 making up the pixel 6. In other words, the seal materials 3a and the layer of the bonding material 4 are provided on a non-display region not overlapping the pixel electrodes 7, i.e., a region corresponding to the BM 12 formed on the counter substrate 1.

Here, for example, assuming that the width of the BM 12 is W, the width of the layer of the bonding agent 4 is M, and the width of a layer of each seal material 3a at the connecting portion 5 is N, the sum (M+2N) of (a) the width of the layer of the bonding agent 4 and (b) the width of the layers of the seal materials 3a at the connecting portion 5 satisfies the relation M+2N<W. Note that, as mentioned above, the width N of the layer of each seal material 3a is narrower than the width of the layer of the seal materials 3.

As the TFT substrates 2a, for example, a glass substrate having a size of 360 mm×465 mm made of non-alkaline glass ("7059" provided by Corning Inc.) may be adopted. From a glass substrate having the above-mentioned size, one small TFT substrate 2a having an area of substantially 300 mm×400 mm can be prepared. In the present embodiment, two TFT substrates 2a are provided. However, as long as the TFT substrates are connected to each other, sandwitching the layers of the seal materials 3a and a layer of the bonding agent 4 at the each connecting portion, three or more TFT substrates may be used.

As the bonding agent 4, it is preferable to adopt a transparent bonding agent which has a refractive index substantially being equal to that of the glass substrate adopted as the TFT substrates 2a. Specifically, a UV-light-curable bonding agent may be adopted. In a UV-light-curable bonding agent, it is possible to adjust the refractive index with ease to a value which is substantially the same as that of the glass substrate adopted as the TFT substrates 2a (refractive index of 1.53 in "7059" provided by Corning Inc.). Thus, it is possible to prevent (1) light from refracting or scattering between the two TFT substrates 2a and (2) a display image from being adversely affected by coloring of light passing through the connecting portion S. Further, because no heat is required to cure a UV-light-curable bonding agent, it is possible to prevent the TFT substrates 2a and the counter substrate 1 from adversely affected by heat.

As a material of the seal materials 3 and 3a, for example, it is possible to adopt heat-curable resin ("XN21" etc. provided by Mitsui Toatsu Chemicals Inc.) or UV-light-curable resin ("WORLD ROCK 701" etc. provided by KYORITSU CHEMICAL & CO., LTD.).

As mentioned above, it is required that the layers of the seal materials 3a and the layer of the bonding agent 4 at the connecting portion 5 are formed on an extremely narrow region so as not to overlap the pixel electrodes 7 of the pixels 6 provided in matrix. In the case of adopting a heat-curable seal material, there is a possibility that the pixels 6 in vicinities of the layers of the seal materials are adversely affected due to the fact that disturbance in the shape of the seal materials or protrusion of a solvent is easily generated when curing the seal materials. Therefore, as the seal materials 3 and 3a, it is preferable to adopt a UV-light-curable seal material. However, provided that the disturbance in the shape of the seal materials and the protrusion of a solvent are suppressed, a heat-curable seal material may be adopted.

In the liquid crystal display device of the present invention, due to the described arrangement of the connecting portion 5, it is possible to suppress the connecting portion 5 from "standing out" on a display screen, and it is also possible to ensure that the pixel pitch in a vicinity of the connecting portion 5 is the same as the pixel pitch of other regions. As a result, it is possible to prevent an adverse effect on the display image caused by connecting of the two TFT substrates 2a.

Also, in the described arrangement of the connecting portion 5, contrary to the conventional arrangement wherein TFT substrates are bonded with each other only on the side surfaces thereof, each TFT substrate 2a is connected to not only the other TFT substrate 2a on the side surface but also the counter substrate 1 via the layer of bonding agent 4. Thus, compared with the conventional liquid crystal display device, bending generated with time on an end portion of each TFT substrate 2a can be prevented, and the strength of the connecting portion 5 is further improved.

Further, in the liquid crystal display device of the present invention, since the liquid crystal layer 14 is formed independently for each of the plurality of TFT substrates 2a, it is possible to control, per TFT substrate 2a, the cell gap of the liquid crystal layer 14, which is a spacing between the TFT substrates 2a and the counter electrode 1. Thus, a conventional problem of a step difference, which is generated when connecting the plurality of small substrates with each other on the side surfaces thereof, adversely affecting the display screen can be prevented.

Figure 5A:
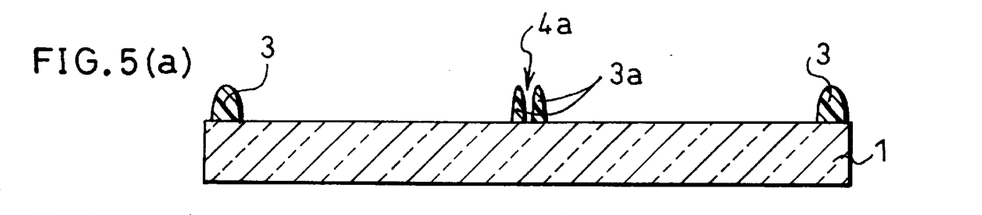
FIG. 5(a) through FIG. 5(e) are cross sectional views explaining a manufacturing method of the liquid crystal panel of FIG. 1, respectively showing an arrangement of the liquid crystal panel in an order of manufacturing steps.

The following will describe a manufacturing method of the liquid crystal panel adopted in the liquid crystal display device of the present embodiment referring to FIG. 5(a) through FIG. 5(e), First, as shown in FIG. 5(a), the seal materials 3 and 3a are applied to the counter substrate 1 provided at least with the CF 11, the BM 12, and the common electrodes 13 (not shown). The seal materials 3 are applied in accordance with the shapes of the two TFT substrates 2a, which are combined with the counter substrate 1 in a later step, in such a manner that opening sections 15 (see FIG. 1) to be used to inject liquid crystal in a later step are formed. Also, as mentioned above, it is preferable that, as the seal materials 3 and 3a, UV-light-curable resin is adopted.

The seal materials 3a applied to a region to be the connecting portion 5 of the TFT substrates 2a are applied with a predetermined spacing so as to form a linear spacing 4a to be filled with the bonding agent 4 which connects the TFT substrates 2a to each other. As mentioned above, the sum of (a) the width of the layer of the bonding agent 4 and (b) the width of the layers of the two seal materials 3a applied on the both sides of the layer of the bonding agent 4 at the connecting portion 5 is narrower than the width of the BM 12 formed on the counter substrate 1. For this reason, the width of the seal materials 3a is so narrow (substantially 0.1 mm) that it is preferable to adopt the dispenser system as a method of applying the seal materials 3a.

Figure 5B:
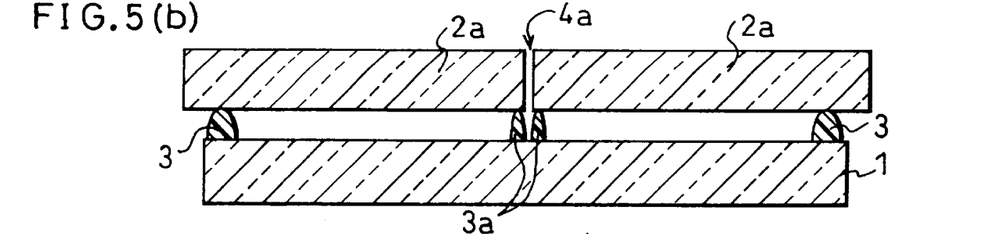

Thereafter, as shown in FIG. 5(b), the two TFT substrates 2a are separately combined one by one with the counter substrate 1 applied with the seal materials 3a. Here, the TFT substrates 2a are positioned so that the TFT substrates 2a coincide with the pattern of the seal materials 3 and 3a applied in the preceding step. It is especially important that the TFT substrates 2a are positioned so that the side of each TFT substrate 2a to be the connecting portion 5, namely, the side adjacent to the other TFT substrate 2a coincides with the pattern of the seal materials 3a.

Figure 5C:
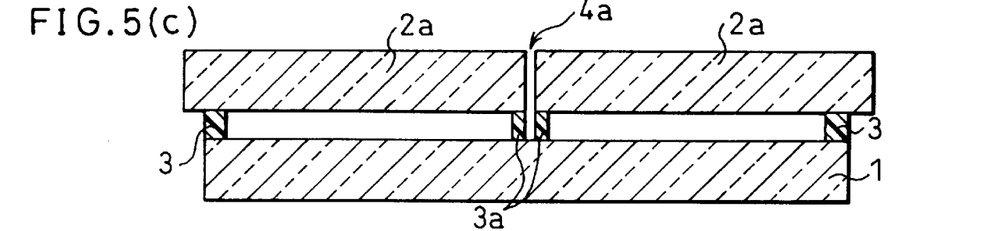

As shown in FIG. 5(c), the TFT substrates 2a and the counter substrate 1 combined with each other are pressed against each other so that the width of the cell (cell gap) takes a predetermined value. The cell gap is determined by the diameter of the spacers (not shown). The spacers are not only included in the seal materials 3 and 3a but are spread over the region surrounded by the patterning of the seal materials 3 and 3a.

As the above-mentioned pressing method, such a method is preferable in which the TFT substrates 2a and the counter substrate 1 are pressed against each other under atmospheric pressure by releasing the pressure inside the cell from the opening sections 15 formed when the seal materials 3 are applied. This makes it possible to uniformly press against each other the counter substrate 1 and the TFT substrates 2a having a large area, respectively. When a predetermined value of the cell gap is obtained, UV light is projected so as to cure the seal materials 3 and 3a.

Figure 5D:
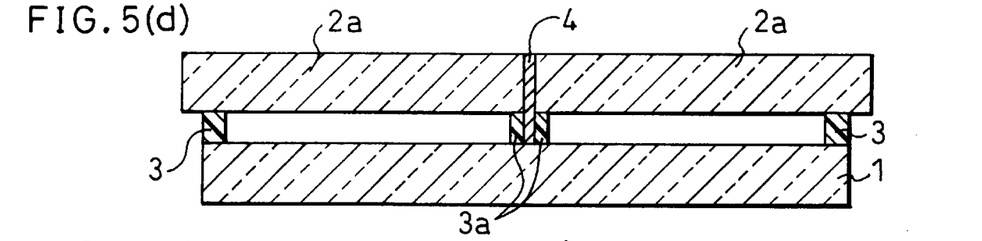
Figure 5E:
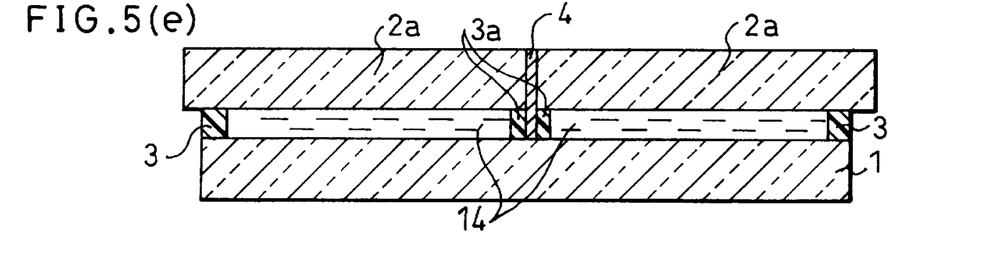

In order to connect to each other the TFT substrates 2a combined with the counter substrate 1, as shown in FIG. 5(d), the bonding agent 4 is injected into the linear spacing 4a so as to be cured. Then, as shown in FIG. 5(e), liquid crystal is injected through the opening sections 15 (see FIG. 1) provided on the patterning of the seal materials 3 so as to form the liquid crystal layer 14. To finish, the opening sections 15 are sealed by a sealant, thereby completing the liquid crystal display device of the present invention.

The following will describe another manufacturing method of the liquid crystal display device of the present invention referring to FIG. 6(a) through FIG. 6(e).

Figure 6A:
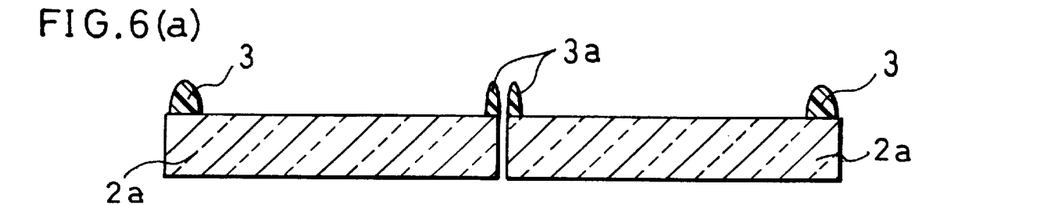
FIG. 6(a) through FIG. 6(e) are cross sectional views explaining another manufacturing method of the liquid crystal panel of FIG. 1, respectively showing an arrangement of the liquid crystal panel in an order of manufacturing steps.

First, as shown in FIG. 6(a), on the two TFT substrates 2a, the seal materials 3 and 3a are applied so as to form the opening sections 15 (see FIG. 1) to be used to inject liquid crystal in a later step.

On the side surfaces of the TFT substrates 2a to be the connecting portion 5, it is required that the seal materials 3a are applied in such a manner that the sum of (a) the width of the seal materials 3a and (b) the width of the layer of the bonding agent 4 to be formed later is narrower than the width of the BM 12 provided on the counter substrate 1. As a method of applying the seal materials 3 and 3a, it is preferable to adopt the dispenser system.

Figure 6B:
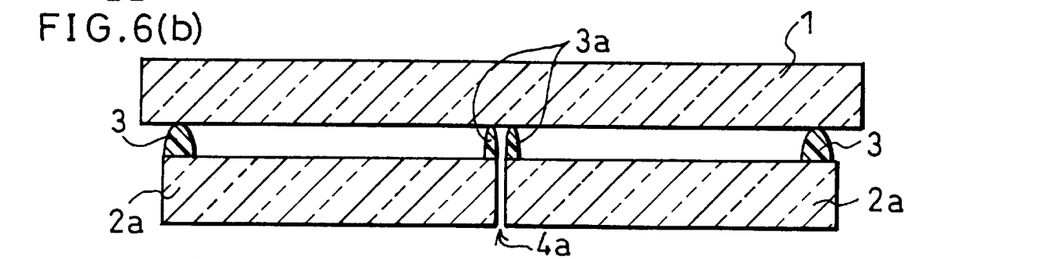

Thereafter, as shown in FIG. 6(b), while being adjacent to each other on the side surfaces to be the connecting portion 5, the two TFT substrates 2a applied with the seal materials 3 and 3a, respectively, are faced with the counter substrate 1 provided with the CF 11, the BM 12, and the common electrodes 13 (not shown). Here, the two TFT substrates 2a are positioned adjacent to each other with a predetermined spacing so as to form the linear spacing 4a to be filled with the bonding agent 4 in a later step.

Figure 6C:
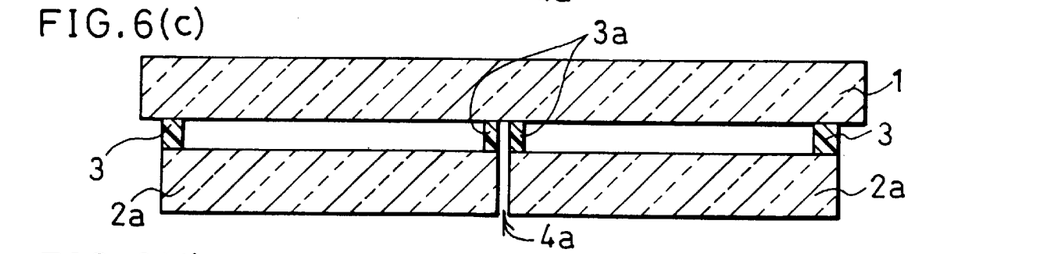

Then, as shown in FIG. 6(c), the TFT substrates 2a and the counter substrate 1 are pressed against each other so that the cell gap of the cell formed therebetween takes a predetermined value. The cell gap is determined by the diameter of the spacers (not shown). The spacers are not only included in the seal materials 3 and 3a but are spread over the region to be provided with the liquid crystal layer 14 surrounded by the patterning of the seal materials 3 and 3a. As a pressing method, it is preferable to adopt the above-mentioned method in which the TFT substrates 2a and the counter substrate 1 are pressed against each other under atmospheric pressure. When a predetermined value of the cell gap is obtained, irradiation of UV light is carried out so as to cure the seal materials 3 and 3a.

Figure 6D:
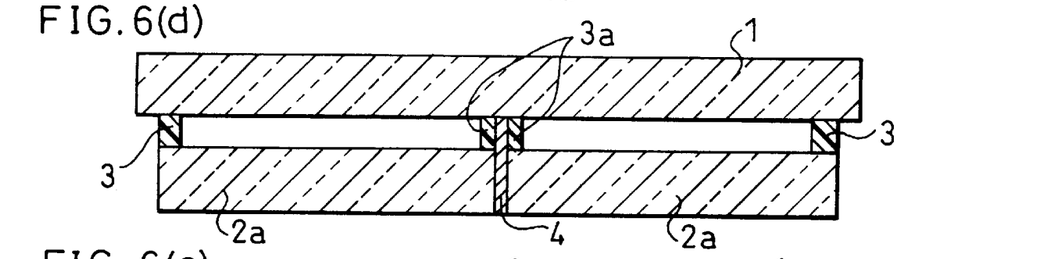

Thereafter, as shown in FIG. 6(d), the bonding agent 4 is injected in the linear spacing 4a formed between the two TFT substrates 2a combined with the counter substrate 1 so as to be cured. As the bonding agent 4, it is preferable to adopt a transparent bonding agent which has a refractive index substantially being equal to that of the glass substrate adopted as the TFT substrates 2a.

Figure 6E:
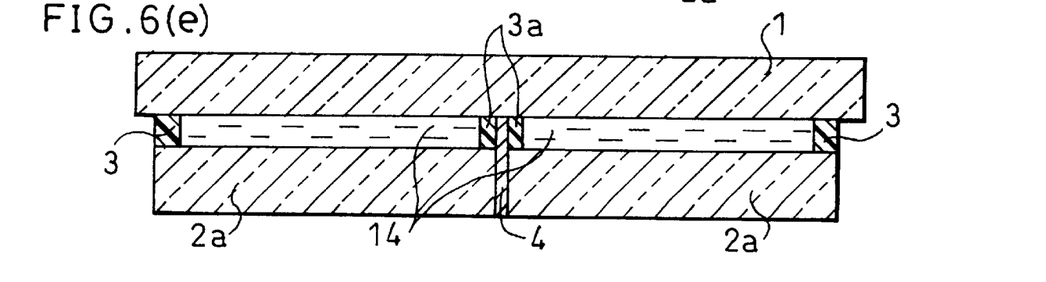

Then, as shown in FIG. 6(e), liquid crystal is injected through the opening sections 15 provided on the patterning of the seal materials 3 so as to form the liquid crystal layer 14. To finish, the opening sections 15 are sealed by a sealant (not shown), thereby completing the liquid crystal display device of the present invention.

As described, the liquid crystal display device of the present invention is manufactured in the following manner. The two TFT substrates 2a are separately combined with the counter substrate 1 by the seal materials 3 and 3a and fixed thereon, and the region to be the connecting portion 5 of the TFT substrates 2a is filled with the bonding agent 4 so as to connect the TFT substrates 2a to each other on the side surfaces. With this manufacturing method, it is possible to prevent the seal materials 3a from entering a narrow gap present on the connecting portion 5. Further, unlike the conventional liquid crystal display device wherein a material adopted as the seal materials is required to be transparent, in the liquid crystal display device in accordance with the present invention, a common seal material of white or light brown can be adopted, thereby reducing the manufacturing cost.

Furthermore, in the liquid crystal display device of the present invention, compared with the conventional liquid crystal display device, there is no complicated manufacturing steps in the manufacturing method; thus, a rise in the manufacturing cost can be suppressed. Particularly, a problem of the conventional manufacturing method can be prevented in which the connecting portion of the TFT substrates is destroyed by only a small amount of external force, resulting in complications in the manufacturing steps.

Note that, in the present embodiment, the explanations are based on the case where two small substrates of the active matrix type adopting TFT as an active element are connected to each other side by side, yet the number of the small substrates are not limited to the specified one. Also, the present invention is not limited to the liquid crystal display device of the active matrix type adopting TFT, but also is applicable to a liquid crystal display device of a simple matrix type adopting an MIM. Moreover, the present invention is applicable to a flat display other than a liquid crystal display device, such as a PDP (Plasma Display Panel) or an FED (Field Emission Display).

As described, in the liquid crystal display device of the present invention having the pair of substrates with electrodes, including the liquid crystal layer therebetween, one of the pair of substrates being composed of the plurality of small substrates connected to each other so as to constitute one large substrate, the seal materials for enclosing the liquid crystal layer are provided independently for each of the plurality of small substrates along peripheries thereof including connecting portions connecting the plurality of small substrates so that the liquid crystal layer is separately enclosed per each of the plurality of small substrates.

With this arrangement, since the seal materials are independently provided for each of the small substrates, at the connecting portion of the small substrates, a layer, such as a layer of the bonding agent, can be provided between the seal material of one of the small substrates and the seal material of the adjacent other small substrate. Thus, such a problem as disclosed in Japanese Unexamined Patent Publication No. 184849/1996 (Tokukaihei 8-184849) can be solved by preventing the seal materials which connect adjoining two small substrates and cover the connecting portion of the two small substrates from intruding into a gap between side surfaces of the two small substrates.

As a result, it is possible to solve a conventional problem of generation of refracting or scattering light at the connecting portions of the plurality of small substrates, induced by the intrusion of the seal materials, thereby preventing an adverse effect on the display image. Further, because the intrusion of the seal materials is prevented, it is not required to adopt transparent seal materials, allowing generally adopted colored resin to be adopted as the seal materials.

As described, the liquid crystal display device of the present invention has an arrangement wherein, in order to connect the small substrates to each other, a bonding agent is injected into a linear spacing between side surfaces of the small substrates facing each other so that the bonding agent thus injected contacts with (a) the counter substrates facing the small substrates and (b) the seal materials respectively provided on the small substrates, facing each other at the connecting portions.

With this arrangement, since the bonding agent is injected into the linear spacing, the seal materials do not intrude into the linear spacing. This prevents the display image from being adversely affected by the seal materials, thereby improving the quality of the liquid crystal display device.

As described, the liquid crystal display device of the present invention has an arrangement wherein the seal materials respectively provided on the small substrates facing each other at the connecting portion are confined in a non-displaying region between pixel electrodes corresponding to a plurality of pixels.

With this arrangement, since the seal materials are provided so as to fall in the non-displaying region, a uniform pixel pitch is obtained throughout the screen of the liquid crystal display device even at the connecting portion of the small substrates. Thus, the display screen is prevented from being adversely affected by the seal materials, thereby further improving the quality of the liquid crystal display device.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A display device comprising:
   a flat connected substrate composed of a plurality of small substrates, each having at least electrodes, the plurality of small substrates being connected to each other on the sides;
   a counter substrate having at least electrodes, provided so as to face said flat connected substrate;
   seal materials for combining each of the plurality of small substrates with said counter substrate so as to enclose a medium therebetween, wherein said seal materials are provided along peripheries of each of the plurality of small substrates without crossing to the other of the plurality of small substrates so that the medium is separately enclosed per each of the plurality of small substrates.

2. The display device as set forth in claim 1, wherein a bonding agent is injected between said seal materials provided along respective adjacent sides of the plurality of small substrates.

3. The display device as set forth in claim 2, wherein the plurality of small substrates include a transparent substrate, and the bonding agent is made of a translucent material having a refractive index substantially equal to a refractive index of the transparent substrate.

4. The display device as set forth in claim 1, wherein the medium is liquid crystal.

5. The display device as set forth in claim 1, wherein the plurality of small substrates are active matrix substrates having active elements.

6. The display device as set forth in claim 1, wherein said seal materials include spacers, each having a predetermined diameter.

7. The display device as set forth in claim 1, wherein said seal materials include UV-light-curable resin.

8. The display device as set forth in claim 1, wherein said counter substrate includes a black matrix, and (a) a width W of the black matrix, (b) a width N of each of said seal materials, and (c) a spacing M between said seal materials respectively provided along respective two adjacent sides of the plurality of small substrates are related to each other by a relation of M+2N<W.

9. A method for manufacturing the display device of claim 8, comprising a step of applying said seal materials to either one of (a) the plurality of small substrates and (b) said counter substrate using a dispenser.

10. A liquid crystal display device comprising:

a pair of substrates with electrodes, including a liquid crystal layer therebetween, one of the pair of substrates being composed of a plurality of small substrates connected to each other so as to constitute one large substrate, the other of the pair of substrates having a counter substrate having at least electrodes, provided so as to face said large substrate; and seal materials for combining each of the plurality of small substrates with said counter substrate so as to enclose the liquid crystal layer therebetween, said seal materials being provided independently for each of the plurality of small substrates along peripheries and connecting parts thereof so that the liquid crystal layer is separately enclosed per each of the plurality of small substrates.

11. The liquid crystal display device as set forth in claim 10, wherein a bonding agent is injected into a spacing between side surfaces of the plurality of small substrates facing each other so that the bonding agent contacts with (a) the other of the pair of substrates and (b) the seal materials respectively provided on the plurality of small substrates facing each other with the spacing therebetween.

12. The liquid crystal display device as set forth in claim 10, wherein the seal materials are positioned so as not to overlap pixel electrodes.

* * * * *